United States Patent
Kolodner et al.

(10) Patent No.: US 6,920,541 B2
(45) Date of Patent: Jul. 19, 2005

(54) TRACE TERMINATION FOR ON-THE-FLY GARBAGE COLLECTION FOR WEAKLY-CONSISTENT COMPUTER ARCHITECTURE

(75) Inventors: Elliot K. Kolodner, Haifa (IL); Ethan Lewis, Haifa (IL); Erez Petrank, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 10/021,424

(22) Filed: Dec. 19, 2001

(65) Prior Publication Data

US 2002/0120823 A1 Aug. 29, 2002

Related U.S. Application Data

(60) Provisional application No. 60/257,633, filed on Dec. 21, 2000.

(51) Int. Cl.$^7$ .............................................. G06F 12/00
(52) U.S. Cl. ...................... 711/170; 711/159; 707/206
(58) Field of Search ........................ 711/133–136, 152, 711/163, 170; 707/1–5, 8, 103, 205, 206; 710/36–37, 200

(56) References Cited

U.S. PATENT DOCUMENTS

| | | | | |
|---|---|---|---|---|
| 6,021,508 A | * | 2/2000 | Schmuck et al. | 714/4 |
| 6,671,707 B1 | * | 12/2003 | Hudson et al. | 707/206 |
| 6,769,004 B2 | * | 7/2004 | Barrett | 707/206 |

OTHER PUBLICATIONS

Doligez and Gonthier, "portable Unobrrasive Garbage Collection for Multi–Processor Systems", Published in the Conference Record of the Twenty first Annual ACM Symposium on Principles of Programming Languages (1994), pp. 70–83.

Domani, et al., "Implementing an On–the–Fly Garbage Collector for Java", Published in the International Symposium on Memory Management, Nov. 2000.

Dijkstra, et al., ON–the–Fly Garbage Collection: An Exercise in Cooperation Published in Communications of the ACM 21:11 (1978), pp. 966–975.

Wilson, "Uniprocessor Garbadge Collection Techniques", Published in the 1992 International Workshop on Memory Management (Sep. 1992), p. 18.

Adve and Gharachorloo, Shared Memory Consistency Models: A Tutorial Published in the IEEE Computer Magazine (Dec. 1996), pp. 66–76.

Doligez and Leroy, :"A Concurrent, Generational Garbage Collector for a Multithreaded Implementation of ML", Proc. 20$^{th}$ Symp. Principles of Programming Languages, 1993, pp. 113–123.

* cited by examiner

*Primary Examiner*—Nasser Moazzami
(74) *Attorney, Agent, or Firm*—Browdy and Neimark, P.L.L.C.

(57) ABSTRACT

A method for memory management in execution of a program by a computer having a memory includes allocating respective portions of the memory to data objects using mutator threads of the program, whereby the objects are held in a heap created by the program. The data objects in the heap are traced so as to mark the data objects that are reachable at a given stage in the program. The computer loops over the mutator threads so as to verify for each of the mutator threads that every update to the allocated portions of the memory in progress by the mutator thread has been completed. The heap is then swept so as to free the memory that is allocated to the data objects that are not marked as reachable, for reallocation to new data objects.

36 Claims, 2 Drawing Sheets

TRACE TERMINATION FOR ON-THE-FLY GARBAGE COLLECTION FOR WEAKLY-CONSISTENT COMPUTER ARCHITECTURE

CROSS-REFERENCE TO RELATED APPLICATIONS

This application claims the benefit of U.S. Provisional Patent Application No. 60/257,633, filed Dec. 21, 2000, which is incorporated herein by reference.

FIELD OF THE INVENTION

The present invention relates generally to efficient use of computer memory in carrying out program instructions, and specifically to methods and apparatus for garbage collection, i.e., for automatic reclamation of unused memory.

BACKGROUND OF THE INVENTION

Programming languages such as Java relieve the programmer of the burden of explicit memory management through the use of automatic garbage collection (GC) techniques that are applied "behind the scenes." When a data object is created, space for the object is allocated in the heap. Unused data objects, which are no longer reachable by the running program via any path of pointer traversals, are considered "garbage." GC automatically reclaims computer storage assigned to such objects, in order to free the storage for reuse. This makes programming in garbage-collected languages significantly easier than in C or C++, for example, in which the programmer must include an explicit "free" statement in order to reclaim memory. GC allows many run-time errors to be avoided and naturally supports modular programming.

A variety of different GC techniques are known in the art. In mark-sweep garbage collectors, garbage collection is implemented in two successive stages. In a first stage, an object graph is traversed, tracing the interrelation of objects starting from specified roots and traversing all connected objects in the heap. Objects that are reachable on this graph are considered live objects. Any other object is considered garbage and can be collected. The live objects are marked in some way so as to distinguish between live objects and garbage. In a second stage, the memory is swept, and all memory space occupied by unmarked objects (garbage) is reclaimed, so that it is free to be reallocated. During the sweep stage, the marked objects are unmarked in preparation for the next GC cycle.

In "concurrent" GC, the execution of application program threads that may update and change the object graph goes on concurrently with the marking and sweeping operations carried out by collector threads. For this reason, threads of the running program are referred to as "mutators," since they mutate, or change, the object graph. Although the concurrent approach avoids processor inactivity during GC, the running program may change the object graph even during the very steps of tracing out reachable data objects by the collector. As a result, there is a risk that the collector may miss marking a live object, and the live object will then be reclaimed during the sweep phase of the collector. In order to avoid this possibility, synchronization between the mutator and collector threads is essential.

"On-the-fly" concurrent GC schemes use implicit synchronization between the mutator and collector threads in order to allow the threads to run concurrently without having to stop for synchronization. This type of GC was first described by Dijkstra et al., in "On-the-Fly Garbage Collection: An Exercise in Cooperation," published in *Communications of the ACM* 21:11 (1978), pages 966–975, which is incorporated herein by reference. Objects are marked by assigning a different "color" attribute to each object, with "white" indicating unmarked objects, and "black" indicating objects that have been marked and traced. Objects that are marked but have not been traced are marked "gray." At the beginning of a GC cycle, all objects are white. The root objects of each local thread and global objects are then marked gray. When the collector encounters a gray object, it knows that its direct descendants in the pointer graph may not yet have been marked (i.e., some may still be white). On the other hand, when an object is marked black, all of its direct descendants are necessarily marked as well, either gray or black. During the mark/trace phase, the collector traces the graph of live objects, and in doing so changes the color of all gray objects to black and their descendants to gray, continuing until no untraced gray objects remain. After all of the live objects have been traced, the collector then sweeps: white objects are reclaimed and appended to the list of free memory, while black objects are changed to white in preparation for the next collection cycle.

Wilson defines a write barrier in "Uniprocessor Garbage Collection Techniques," published in the 1992 *International Workshop on Memory Management* (September 1992), p. 18, herein incorporated by reference, as an action taken by the mutator to trap or record a write operation into an object. There are a variety of ways to implement write barriers for on-the-fly GC. For example, Doligez and Gonthier describe a collector, in "Portable Unobtrusive Garbage Collection for Multi-Processor Systems," published in the *Conference Record of the Twenty-first Annual ACM Symposium on Principles of Programming Languages* (1994), pages 70–83, which is incorporated herein by reference, in which the mutator grays objects prior to updating and raises a flag to indicate to the collector that there are objects left to trace. Only afterward does it update the reference. While GC is active, the mutator grays pointers to white objects whenever they are overwritten, i.e., when an object cell is updated, the object previously referenced is grayed. Domani et al. describe another solution in "Implementing an On-the-Fly Garbage Collector for Java," published in the *International Symposium on Memory Management* (November 2000), wherein the mutator writes the address of the object to a local markstack and afterwards updates the pointer. The present invention, as described hereinbelow, is not limited to a particular type of write barrier and can operate with write barriers of different types.

Many current multiprocessor system support relaxed consistency memory models. Relaxed consistency models, which includes weak-consistency models, allow the constraints on sequential execution of the instructions in a program to be relaxed. (By contrast, in sequential consistency models, memory accesses must always appear as if they are executed in the sequence in which they appear in the program code.) Adve and Gharachorloo describe the concepts behind weak consistency in "Shared Memory Consistency Models: A Tutorial," published in the *IEEE Computer Magazine* (December 1996), pp. 66–76, which is incorporated herein by reference. The authors describe the advantages of weak consistency in a multiprocessor execution environment, in which different pieces of a single program may execute on different processing units. They describe problems inherent in weak consistency and models for overcoming the problems. In particular, they introduce the concept of a safety net to enforce sequential program execution order when necessary. A fence instruction is an example of such a safety net, as the instruction imposes program order between various memory operations.

Relaxed consistency breaks assumptions in the GC implicit object synchronization described above. For instance, assume that an object, A, holds a reference to an object, O. The GC has not yet traced another object B, and has not yet traced object O. The following sequence of actions occurs:

1. Mutator M1 grays O in preparation for an update.
2. Mutator M2 writes a reference to O in object B.
3. Mutator M1 overwrites the reference to O in A.

Under sequential consistency, the garbage collector will trace O as a result of step 1, or will trace O as a result of its connection to A. However, under weak consistency the order of steps 1 and 2 may be reversed. The collector could trace B before O is connected to B, conclude that there are no more gray objects, and terminate the trace before O and its descendents are marked. The result will be that the descendents of O will not be traced, and may be left with a white color attribute in the trace phase of garbage collection. In the sweep phase, since all white objects are returned to the free memory list, active memory could be corrupted.

Both of the solution of Doligez and Gonthier and that of Domani et al., as mentioned above, could be adapted for relaxed consistency by using a fence instruction between steps 1 and 2 in the example above. Fence instructions are expensive, however, since they increase program overhead. Since updates are a frequent operation, the fence instructions also execute frequently, slowing program execution. As a result, the advantages of weak consistency in terms of speeding program execution can be largely lost.

SUMMARY OF THE INVENTION

Preferred embodiments of the present invention provide a method for terminating the trace phase of on-the-fly GC without the cost of adding a fence instruction to the mutator protocol for updates. Instead, the collector executes a synchronization loop over the mutators. The collector traces the graph of all live objects. It then begins executing the synchronization loop to finish tracing, marking all gray objects in each iteration. The purpose of the synchronization loop is to force each mutator to perform a fence operation. This operation covers all updates previously done by the mutator and cannot be performed in the middle of an update/write barrier sequence. If nothing is marked gray at the end of an iteration, trace is done. The collector then sweeps all non-live objects back to a free memory pool.

The synchronization loop can be expected to run once per collection. Thus, instead of a fence operation on every object update during trace, it is sufficient to perform a single fence operation for each mutator. Consequently, the burden of implementing the write barrier to perform on-the-fly GC in a system with weak memory consistency is substantially reduced, by comparison with methods known in the art.

There is therefore provided, in accordance with a preferred embodiment of the present invention, a method for memory management in execution of a program by a computer having a memory, including:

allocating respective portions of the memory to data objects using mutator threads of the program, whereby the objects are held in a heap created by the program;

tracing the data objects in the heap so as to mark the data objects that are reachable at a given stage in the program;

looping over the mutator threads so as to verify for each of the mutator threads that every update to the allocated portions of the memory in progress by the mutator thread has been completed; and sweeping the heap so as to free the memory that is allocated to the data objects that are not marked as reachable, for reallocation to new data objects.

Preferably, looping over the mutator threads includes forcing each of the mutator threads to perform a fence operation.

Typically, to update the allocated portions of the memory, the mutator threads record pointer references, and tracing includes marking the data objects referenced by the pointer references as reachable. Preferably, looping includes looping until all the data objects referenced by pointer references that have been newly discovered are marked as reachable. Additionally or alternatively, looping over the mutator threads includes verifying that each of the mutator threads has completed performing every update in progress by ensuring that each of the mutator threads finishes a write barrier for every update it is executing.

Preferably, tracing the data objects includes tracing the objects using a collector thread, wherein looping over the mutator threads includes verifying that each of the mutator threads has completed performing every update in progress by carrying out a handshake protocol between the collector and mutator threads. In a preferred embodiment, carrying out the handshake protocol includes sending an interrupt using the collector thread and handling the interrupt using the mutator threads.

Additionally or alternatively, carrying out the handshake protocol includes setting a value of a status variable in the collector thread before looping over all the mutator threads, and testing the value of the status variable in the mutator threads against the value in the collector thread. Preferably, carrying out the handshake protocol includes, after each one of the mutator threads has completed performing the updates, setting the value of the status variable in that one of the mutator threads equal to the value of the status variable in the collector thread.

Preferably, the collector and mutator threads operate on the memory concurrently, and the memory is accessed in accordance with a relaxed-consistency architectural scheme.

There is also provided, in accordance with a preferred embodiment of the present invention, computing apparatus, including:

a memory, arranged to store data; and one or more processors, coupled to allocate respective portions of the memory to data objects using mutator threads of a program running on the apparatus, whereby the objects are held in a heap created by the program, to trace the data objects in the heap so as to mark the data objects that are reachable at a given stage in the program, to loop over the mutator threads so as to verify for each of the mutator threads that every update to the allocated portions of the memory in progress by the mutator thread has been completed, and to sweep the heap so as to free the memory that is allocated to the data objects that are not marked as reachable, for reallocation to new data objects.

There is additionally provided, in accordance with a preferred embodiment of the present invention, a computer software product, including a computer-readable medium in which code instructions are stored, which instructions, when read by a computer having a memory, cause the computer to allocate respective portions of the memory to data objects using mutator threads of a program in execution by the computer, whereby the objects are held in a heap created by the program, and further cause the computer to trace the data objects in the heap so as to mark the data objects that are reachable at a given stage in the program, to loop over the mutator threads so as to verify for each of the mutator threads that every update to the allocated portions of the memory in progress by the mutator thread has been completed, and to sweep the heap so as to free the memory that is allocated to the data objects that are not marked as reachable, for reallocation to new data objects.

The present invention will be more fully understood from the following detailed description of the preferred embodiments thereof, taken together with the drawings in which:

DETAILED DESCRIPTION OF PREFERRED EMBODIMENTS

Figure 1:
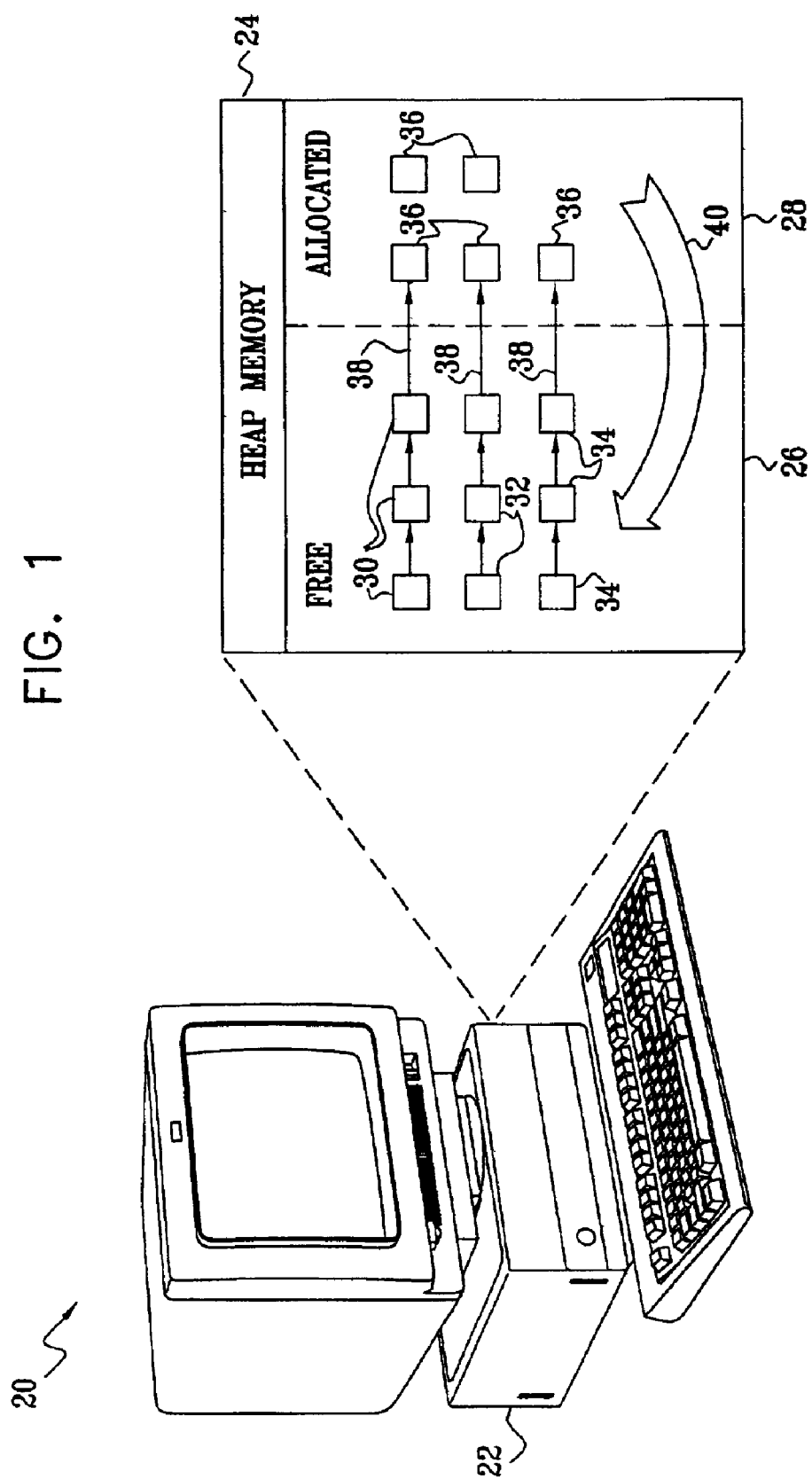
FIG. 1 is a schematic representation of a computer system, adapted to run program code using memory allocation and garbage collection (GC), in accordance with a preferred embodiment of the present invention.

Reference is now made to FIG. 1, which is a schematic, partly pictorial representation of a computer system 20 for running program code with memory allocation and garbage collection (GC), in accordance with a preferred embodiment of the present invention. The system comprises a processor (or processors) 22 and a heap memory 24. The processor typically has both RAM and disk memory used in storing and running software code, preferably Java language code, as well as for maintaining the heap. Alternatively, the principles described hereinbelow may be applied to code written in other programming languages that allow for GC.

In the general, conceptual view shown in FIG. 1, heap memory 24 comprises, inter alia, a free portion 26, holding unallocated memory, and a portion of allocated objects 28. (The separation of the free and allocated portions of the memory is, of course, only conceptual, and these portions are generally interspersed in the physical memory of the processor.) Processor 22 manages heap memory 24 by organizing free memory 26 into blocks 30, 32 and 34. Initially, when a program thread, or mutator, whose memory allocation process is represented in FIG. 1 by arrows 38, needs to allocate memory to a new object, it selects a free block 30, 32 or 34 of appropriate size. The mutator then allocates all or part of the block, creating an object 36 in allocated memory 28. The mutator initializes the color of the objects (typically to "white," depending on the current stage in the collection cycle) for purposes of subsequent object tracing. As new objects need to be created, the mutator continues to use the memory in the block that it has prepared until it has allocated all of the free memory in the block. It then begins allocating another block from free memory 26.

Periodically, a GC thread, or collector, represented by an arrow 40, marks, traces and sweeps objects 36, so as to return memory that is allocated to unreachable objects to the pool of free memory 26. The collection is preceded by a handshake between the collector and the mutator threads, to force the mutators to complete any updates they are executing, as described hereinbelow.

The GC-related functions carried out by system 20 are typically performed by software running on processor 22. The specific software code for GC is preferably supplied as a part of a Java Virtual Machine (JVM) package or other program execution module, but it may alternatively be supplied separately as an add-on or plug-in to an existing software package. The software packages and code may be supplied on tangible media, such as diskettes or CD-ROM, and loaded into the system. Alternatively, the software may be downloaded to the system via a network connection or other electronic link.

Figure 2:
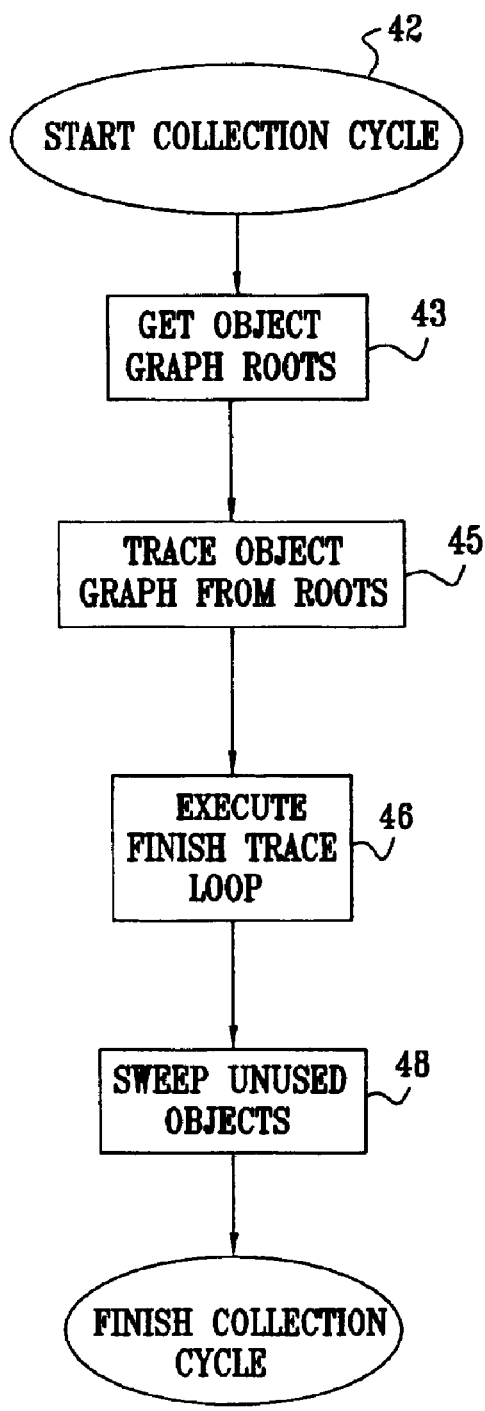
FIG. 2 is a flow chart that schematically illustrates a method for on-the-fly GC, in accordance with a preferred embodiment of the present invention.

FIG. 2 is a flow chart that schematically illustrates the actions of the collector thread, in accordance with a preferred embodiment of the present invention. At a start cycle step 42, all objects are colored white. At a get roots step 43, the collector thread determines the root objects, including global roots and the roots of all mutator threads. At a trace object step 45, all objects that are reachable from the roots are traced, changing color from white to gray to black. Trace step 45 terminates when all objects visible to the collector in the reachability graph have been traced.

At a finish trace loop step 46, the collector loops over each mutator, synchronizing object coloring with each in turn. Table 1 is a pseudocode listing of the steps involved in finish trace loop step 46, in accordance with a preferred embodiment of the present invention. At a first step in the loop, the collector traces over all gray objects, continuing until it sees no more gray objects, coloring the white descendants of each gray object gray, and coloring the gray parent object black. The collector then loops over all the mutators, synchronizing object coloring with each in turn. For each mutator m, this operation includes ensuring m is not updating a pointer and causing m to execute a fence instruction. After looping over all the mutators, the collector executes a fence instruction. Finish trace loop 46 terminates when there are no more gray objects.

TABLE 1

Finish Trace Loop

```
do
{
    trace all gray objects
    for all mutators m do
    {
        ensure m is not currently updating a pointer
        force m to do a fence operation
    }
    collector executes a fence operation
}
while there are gray objects
```

At this point, a sweep step 48 begins, and the collector sweeps the remaining white objects into free memory 26.

In another embodiment of the present invention, a collector-mutator handshake operation provides object coloring synchronization. A handshake is an event in which the collector requests an action from a mutator, and the mutator responds by completing the action. Once all the mutators have responded to the request by the collector, the handshake is finished. A mutator, by definition, cannot respond to a handshake request during the execution of an update. Therefore, the execution of a handshake indicates that the mutator has completed execution of any update in progress. Table 2 is a pseudocode listing of the handshake method of object color synchronization.

TABLE 2

Finish Trace Loop by Handshaking

```
do
{
    trace all gray objects
    for all mutators m do
```

TABLE 2-continued

Finish Trace Loop by Handshaking

```
    {
        handshake with m*
    }
    collector executes a fence operation
}
while there are gray objects
```

*m executes a fence operation as part of the handshake

When processor 22 includes hardware for interrupting the mutators, this capability can be used for carrying out the handshake. For example, in the IBM AS/400 system, when a gc interrupt is sent to the mutators, the mutators will accept and process the interrupt only at predefined points, and never in the middle of an update. In other words, the mutators must complete all memory updates before servicing the interrupt. Processing of the gc interrupt by a mutator causes the mutator to execute a fence operation.

To manage handshaking with the mutators, the collector sets a status variable at step 46. After receiving the gc interrupt and executing the fence operation, the mutator additionally sets a thread-local status variable to be identical to the status variable in the collector. Thus, the collector can send a gc interrupt, and subsequently check the value of each mutator's status variable against the value of its own status variable to test for a done response to the interrupt. When all of the mutators have set their status variables to that of the collector, the loop over all the mutators is complete, and the collector can proceed to sweep step 48.

Table 3 is a pseudocode listing of finish trace loop step 46 for use on platforms with gc interrupt hardware. Table 4 is a pseudocode listing of the actions taken by the mutators in response to gc interrupts sent by the collector.

TABLE 3

Finish Trace Loop by Handshaking

```
do
{
    trace all gray objects
    change collector status
    send gc interrupt to each mutator thread
    do
    {
        done = true
        for all mutators m do
        {
            if status of m != collector status
                done = false
        }
    }
    while !done
    collector executes a fence operation
}
while there are gray objects
```

TABLE 4

Mutator GC Interrupt Service Routine

```
Interrupt cannot be handled during update operation
if status (mutator) != status (collector)
{
    execute fence operation
    status (mutator) = status (collector)
        (Additional code possible depending on design details)
}
```

The values white, gray and black used in the GC methods described hereinabove used are by way of example only. Different values of the GC variables may be used in each cycle, and additional values may also be used, as is known in the art. Furthermore, although preferred embodiments are described above with reference to system 20, using block-based memory allocation, the principles of the present invention are also applicable to other methods of memory allocation and concurrent GC. The modifications necessary to adapt the particular methods described herein to other types of memory management and different GC approaches will be apparent to those skilled in the art.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for memory management in execution of a program by a computer having a memory, comprising:

allocating respective portions of the memory to data objects using mutator threads of the program, whereby the objects are held in a heap created by the program;

tracing the data objects in the heap so as to mark the data objects that are reachable at a given stage in the program;

looping over the mutator threads so as to verify for each of the mutator threads that every update to the allocated portions of the memory in progress by the mutator thread has been completed; and sweeping the heap so as to free the memory that is allocated to the data objects that are not marked as reachable, for reallocation to new data objects.

2. A method according to claim 1, wherein looping over the mutator threads comprises forcing each of the mutator threads to perform a fence operation.

3. A method according to claim 1, wherein to update the allocated portions of the memory, the mutator threads record pointer references, and wherein tracing comprises marking the data objects referenced by the pointer references as reachable.

4. A method according to claim 3, wherein looping comprises looping until all the data objects referenced by pointer references that have been newly discovered are marked as reachable.

5. A method according to claim 1, wherein looping over the mutator threads comprises verifying that each of the mutator threads has completed performing every update in progress by ensuring that each of the mutator threads finishes a write barrier for every update it is executing.

6. A method according to claim 1, wherein tracing the data objects comprises tracing the objects using a collector thread.

7. A method according to claim 6, wherein looping over the mutator threads comprises verifying that each of the mutator threads has completed performing every update in progress by carrying out a handshake protocol between the collector and mutator threads.

8. A method according to claim 7, wherein carrying out the handshake protocol comprises sending an interrupt using the collector thread and handling the interrupt using the mutator threads.

9. A method according to claim 7, wherein carrying out the handshake protocol comprises setting a value of a status variable in the collector thread before looping over all the mutator threads, and testing the value of the status variable in the mutator threads against the value in the collector thread.

10. A method according to claim 9, wherein carrying out the handshake protocol comprises, after each one of the mutator threads has completed performing the updates, setting the value of the status variable in that one of the mutator threads equal to the value of the status variable in the collector thread.

11. A method according to claim 6, wherein the collector and mutator threads operate on the memory concurrently.

12. A method according to claim 1, wherein the memory is accessed in accordance with a relaxed-consistency architectural scheme.

13. Computing apparatus, comprising:
a memory, arranged to store data; and
one or more processors, coupled to allocate respective portions of the memory to data objects using mutator threads of a program running on the apparatus, whereby the objects are held in a heap created by the program, to trace the data objects in the heap so as to mark the data objects that are reachable at a given stage in the program, to loop over the mutator threads so as to verify for each of the mutator threads that every update to the allocated portions of the memory in progress by the mutator thread has been completed, and to sweep the heap so as to free the memory that is allocated to the data objects that are not marked as reachable, for reallocation to new data objects.

14. Apparatus according to claim 13, wherein the one or more processors are adapted to loop over the mutator threads so as to force each of the mutator threads to perform a fence operation.

15. Apparatus according to claim 13, wherein to update the allocated portions of the memory, the mutator threads record pointer references, and wherein the one or more processors are arranged to trace the data objects by marking the data objects referenced by the pointer references as reachable.

16. A method according to claim 15, wherein the one or more processors are arranged to loop until all the data objects referenced by pointer references that have been newly discovered are marked as reachable.

17. Apparatus according to claim 13, wherein the one or more processors are arranged to verify that each of the mutator threads has completed performing every update in progress by ensuring that each of the mutator threads finishes a write barrier for every update it is executing.

18. Apparatus according to claim 13, wherein the one or more processors are arranged to trace the data objects using a collector thread.

19. Apparatus according to claim 18, wherein the one or more processors are arranged to verify that each of the mutator threads has completed performing every update in progress by carrying out a handshake protocol between the collector and mutator threads.

20. Apparatus according to claim 19, wherein the one or more processors are arranged to carry out the handshake protocol by sending an interrupt using the collector thread and handling the interrupt using the mutator threads.

21. Apparatus according to claim 19, wherein the one or more processors are arranged to carry out the handshake protocol by setting a value of a status variable in the collector thread before beginning to loop over all the mutator threads, and testing the value of the status variable in the mutator threads against the value in the collector thread.

22. Apparatus according to claim 21, wherein in accordance with the handshake protocol, after each one of the mutator threads has completed performing the updates, the value of the status variable in that one of the mutator threads is set equal to the value of the status variable in the collector thread.

23. Apparatus according to claim 18, wherein the one or more processors are arranged so that the collector and mutator threads operate on the memory concurrently.

24. Apparatus according to claim 13, wherein the one or more processors are arranged to access the memory in accordance with a relaxed-consistency architectural scheme.

25. A computer software product, comprising a computer-readable medium in which code instructions are stored, which instructions, when read by a computer having a memory, cause the computer to allocate respective portions of the memory to data objects using mutator threads of a program in execution by the computer, whereby the objects are held in a heap created by the program, and further cause the computer to trace the data objects in the heap so as to mark the data objects that are reachable at a given stage in the program, to loop over the mutator threads so as to verify for each of the mutator threads that every update to the allocated portions of the memory in progress by the mutator thread has been completed, and to sweep the heap so as to free the memory that is allocated to the data objects that are not marked as reachable, for reallocation to new data objects.

26. A product according to claim 25, wherein the instructions cause the computer to loop over the mutator threads so as to force each of the mutator threads to perform a fence operation.

27. A product according to claim 25, wherein to update the allocated portions of the memory, the mutator threads record pointer reference, and wherein the instructions cause the computer to trace the data objects by marking the data objects referenced by the pointer references as reachable.

28. A product according to claim 27, wherein the instructions cause the computer to loop until all the data objects referenced by pointer references that have been newly discovered are marked as reachable.

29. A product according to claim 25, wherein the instructions cause the computer to verify that each of the mutator threads has completed performing every update in progress by ensuring that each of the mutator threads finishes a write barrier for every update it is executing.

30. A product according to claim 25, wherein the instructions cause the computer to trace the data objects using a collector thread.

31. A product according to claim 30, wherein the instructions cause the computer to verify that each of the mutator threads has completed performing every update in progress by carrying out a handshake protocol between the collector and mutator threads.

32. A product according to claim 31, wherein the instructions cause the computer to carry out the handshake protocol by sending an interrupt using the collector thread and handling the interrupt using the mutator threads.

33. A product according to claim 31, wherein the instructions cause the computer to carry out the handshake protocol by setting a value of a status variable in the collector thread before beginning to loop over all the mutator threads, and testing the value of the status variable in the mutator threads against the value in the collector thread.

34. A product according to claim 33, wherein in accordance with the handshake protocol, after each one of the mutator threads has completed performing the updates, the value of the status variable in that one of the mutator threads is set equal to the value of the status variable in the collector thread.

35. A product according to claim 30, wherein the instructions cause the collector and mutator threads to operate on the memory concurrently.

36. A product according to claim 25, wherein the instructions cause the computer to access the memory in accordance with a relaxed-consistency architectural scheme.

* * * * *